(No Model.)

C. HARVEY & W. PADDOCK.
VELOCIPEDE.

No. 303,513. Patented Aug. 12, 1884.

Witnesses
James Young.
Lloyd B. Wight.

Inventors.
Charles Harvey,
Wm. Paddock,

UNITED STATES PATENT OFFICE.

CHARLES HARVEY AND WILLIAM PADDOCK, OF BIRMINGHAM, COUNTY OF WARWICK, ASSIGNORS TO WILLIAM THOMAS SHAW, OF SURBITON, ENGLAND.

VELOCIPEDE.

SPECIFICATION forming part of Letters Patent No. 303,513, dated August 12, 1884.

Application filed June 6, 1884. (No model.) Patented in England May 9, 1882, No. 2,174.

*To all whom it may concern:*

Be it known that we, CHARLES HARVEY, of Birmingham, in the county of Warwick, England, manager, and WILLIAM PADDOCK, of the same place, engineer, subjects of the Queen of Great Britain, have invented certain new and useful Improvements in Tricycles and other Velocipedes, (for which we have received Letters Patent in Great Britain, No. 2,174, dated May 9, 1882,) of which the following is a specification.

The object of this invention is to enable the rider of a tricycle or other velocipede to drive the machine at a quick or slow speed, as he may desire, or to throw the driving-cranks out of gear when descending hills, so that the cranks may remain at rest while the road-wheels revolve. To effect this we mount loosely upon the crank or driving axle a chain or driving wheel, and we give motion to this chain or driving wheel from the driving-axle by planetary spur-pinions, which gear with an internally-toothed wheel, and also with a toothed wheel which is loose on the axle, but which, by a clutch capable of sliding endwise of the axle, can either be clutched fast to the framing of the machine or can be clutched to the chain or driving wheel.

Figure 1:
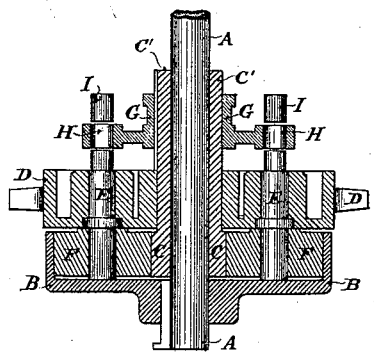
Figure 3:
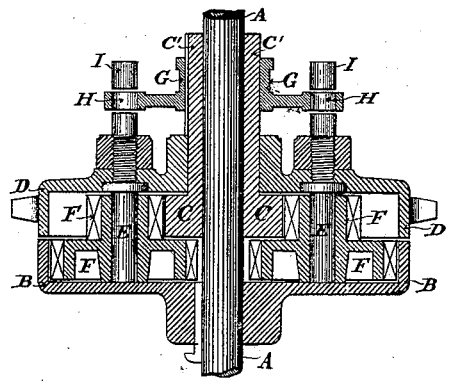
Figure 2:
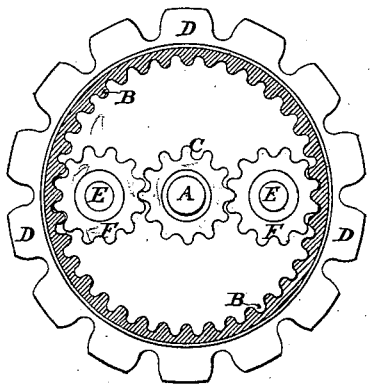
Figure 4:
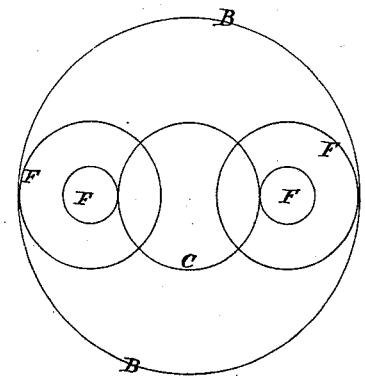

Figure 1 is a longitudinal section, and Fig. Fig. 2 a transverse section, of apparatus constructed according to our invention. Figs. 3 and 4 show similar views of a modified form of the apparatus shown at Figs. 1 and 2.

In Figs. 1 and 2, A is the crank or driving axle. B is an internal-toothed wheel secured to this axle. C is a toothed wheel having a long boss or bush, C', through which the axle passes, and which can revolve freely upon the axle. D is a chain or driving wheel. It can turn freely upon the long boss or bush C'. It also has studs E projecting from it, on which are carried pinions F. These pinions gear with the internally-toothed wheel B, and also with the toothed wheel C. G is a sliding clutch capable of being slid along the boss or bush C', but not of turning upon it. In the clutch are holes H. The clutch can, by an ordinary forked clutch-lever, (not shown in the drawings,) be shifted endwise, so as to cause the holes H either to engage with prolongations of the studs E or engage with fixed pins I, carried by the frame-work of the tricycle, or such like velocipede, or can be held in a central position, as shown in Fig. 1. When the clutch is held in the central position, the chain or driving wheel can revolve without turning the crank or driving axle. When the clutch is made to engage with the studs E, the toothed wheel C is locked to the chain or driving wheel, and when the crank or driving axle is revolved the chain or driving wheel will be carried round with it at the same speed. When the clutch is made to engage with the fixed pins I, the toothed wheel C is held fast, and when the crank or driving axle is revolved, the internally-toothed wheel B drives the pinions F, and causes these pinions to roll around the toothed wheel C, and consequently gives a revolving motion at a slower speed to the chain or driving wheel, which carries the studs upon which the pinions F are mounted.

In the modification shown at Figs. 3 and 4, in place of the pinions F gearing both into the internally-toothed wheel B and into the externally-toothed wheel C, the pinions F are each made of two different diameters, and the larger diameter is made to gear with the internally-toothed wheel B, while the smaller diameter gears with the externally-toothed wheel C. In this way the speed at which the chain or driving wheel is driven from the crank-axle when the toothed wheel C is held fast can be varied to a greater extent than could in some cases readily be effected by varying the relative diameters of the wheels B and C. Motion is transmitted from the chain or driving wheel D by an endless chain, or by gear-wheels or otherwise, to another wheel on the axle of the driving wheel or wheels of the velocipede.

Having thus described our invention, we would state that we claim—

The combination of the driving-axle A, the chain or driving wheel D, loose upon it, the toothed wheel C, also loose upon it, the planetary pinions F, the internally-toothed wheel B, and the sliding clutch G, capable of being slid endwise of the axle to lock the toothed wheel C either to fixed pins I or to studs projecting from the chain or driving wheel D, substantially as described.

CHARLES HARVEY. [L. S.]
WILLIAM PADDOCK. [L. S.]

Witnesses:
RICHARD SKERRETT,
ARTHUR J. POWELL.